US008316379B2

(12) United States Patent
Wang et al.

(10) Patent No.: US 8,316,379 B2
(45) Date of Patent: Nov. 20, 2012

(54) METHOD FOR INVOKING UOML INSTRUCTIONS

(75) Inventors: Donglin Wang, Beijing (CN); Kaihong Zou, Beijing (CN)

(73) Assignee: Sursen Corp., Beijing (CN)

( * ) Notice: Subject to any disclaimer, the term of this patent is extended or adjusted under 35 U.S.C. 154(b) by 790 days.

(21) Appl. No.: 12/415,643

(22) Filed: Mar. 31, 2009

(65) Prior Publication Data

US 2009/0187927 A1 Jul. 23, 2009

Related U.S. Application Data

(63) Continuation of application No. PCT/CN2007/070132, filed on Jun. 19, 2007.

(30) Foreign Application Priority Data

Nov. 20, 2006 (CN) .......................... 2006 1 0114649

(51) Int. Cl.
*G06F 3/00* (2006.01)
*G06F 9/54* (2006.01)

(52) U.S. Cl. .......................... 719/313; 719/328; 719/330

(58) Field of Classification Search ........................ None
See application file for complete search history.

(56) References Cited

U.S. PATENT DOCUMENTS

| 6,480,865 | B1 | 11/2002 | Lee et al. ....................... 707/523 |
| 7,010,796 | B1 * | 3/2006 | Strom et al. ................... 719/328 |
| 2004/0015840 | A1 | 1/2004 | Walker ........................... 717/108 |
| 2008/0010629 | A1 | 1/2008 | Berg .............................. 717/116 |

FOREIGN PATENT DOCUMENTS

| CN | 1979472 A | 6/2007 |
| CN | 1979511 A | 6/2007 |
| CN | 1983251 A | 6/2007 |
| CN | 101192101 B | 5/2010 |
| WO | WO 2005/008484 A1 | 1/2005 |

OTHER PUBLICATIONS

Wang, et al. "UOML (Unstructured Operation Markup Language)", Oct. 10, 2008, OASIS Standard, Part 1 Version 1.0.*
Wang, et al. "UOML (Unstructured Operation Markup Language)", Jan. 24, 2008, Committee Draft 03, Part 1 Version 1.0.*
European Search Report issued for European Application No. 07721752.9; Dec. 3, 2009.
Second Chinese Office Action issued for Chinese Application No. 2006101146491.

* cited by examiner

*Primary Examiner* — Qing Wu

(74) *Attorney, Agent, or Firm* — David Xue; Goodwin Procter LLP

(57) ABSTRACT

Embodiments of the present invention disclose a method for encapsulating Unstructured Operation Markup Language (UOML) into an Application Programming Interface (API), including: mapping an object of an UOML operation to a data type of a programming language, mapping the UOML operation to an API function prototype in the programming language, wherein an attribute or sub element of the UOML operation is mapped to a parameter of the API function prototype; wherein, when an API function is invoked, the API function issues a corresponding UOML operation instruction to a docbase management system according to the mapping relations; after an operation defined by the UOML operation instruction is executed by the docbase management system, the return result from the docbase management system is converted into a data type of the programming language by the API function. In this way, API functions in different programming languages, which correspond to the UOML, can be implemented, and the application developers of the programming languages may invoke suitable API functions directly to implement applications on the docbase management system, thus the development efficiency can be improved.

10 Claims, 4 Drawing Sheets

METHOD FOR INVOKING UOML INSTRUCTIONS

CROSS-REFERENCE TO RELATED APPLICATIONS

This application claims the benefit and is a continuation of PCT/CN2007/070132 filed Jun. 19, 2007, which is the PCT filing of CN200610114649.1 filed Nov. 20, 2006, all of which applications are fully incorporated herein by reference.

FIELD OF THE INVENTION

The present invention relates to electronic document processing technologies, and particularly to a method for encapsulating Unstructured Operation Markup Language (UOML) into an Application Programming Interface (API).

BACKGROUND OF THE INVENTION

The UOML standard includes a series of docbase management system instructions defined according to a format of "action+object" in Extensible Markup Language (XML), which has been explained in detail in a Chinese patent application with Application No. CN 200510131641.1. Since XML works across different platforms and with different languages, the UOML standard can enable the docbase management system instructions to be exchanged across the different platforms in the different languages. However, in practical applications, operations on a docbase are usually controlled by using programs written in programming languages, hence the programs need to parse and process UOML XML texts. If every application developer designs his/her own way of parsing and processing UOML XML texts in his/her programs, the workload of coding will increase significantly and the efficiency of coding will drop sharply.

SUMMARY OF THE INVENTION

The objective of the present invention is to provide a method for encapsulating Unstructured Operation Markup Language (UOML) into an Application Programming Interface (API) of a programming language so as to improve the development efficiency of docbase management system application developers.

The method provided by the present invention for encapsulating UOML into an API includes:

mapping an object of an UOML operation to a data type of a programming language, mapping the UOML operation to an API function prototype in the programming language, wherein an attribute or sub element of the UOML operation is mapped to a parameter of the API function prototype;

wherein, when an API function is invoked, the API function issues a corresponding UOML operation instruction to a docbase management system according to the mapping relations;

after an operation defined by the UOML operation instruction is executed by the docbase management system, the return result from the docbase management system is converted into a data type of the programming language by the API function.

According to the method provided by embodiments of the present invention, the UOML can be encapsulated into API in the programming language. When a developer develops an application of the docbase management system with the programming language, the encapsulated API in the programming language can be invoked directly, therefore a lot of works on parsing the UOML can be saved and the development efficiency can be improved.

DETAILED DESCRIPTION OF THE INVENTION

In embodiments of the present invention, by utilizing the characterized format of the UOML standard, i.e., "action+object", and the internal mapping relations between UOML objects and classes or structures of programming languages, the present invention provides a method for encapsulating UOML into APIs of different programming languages, therefore, when an application of the docbase management system is developed with a programming language, the API prepared for the UOML in the programming language can be invoked directly to improve the efficiency of developers.

Figure 1:
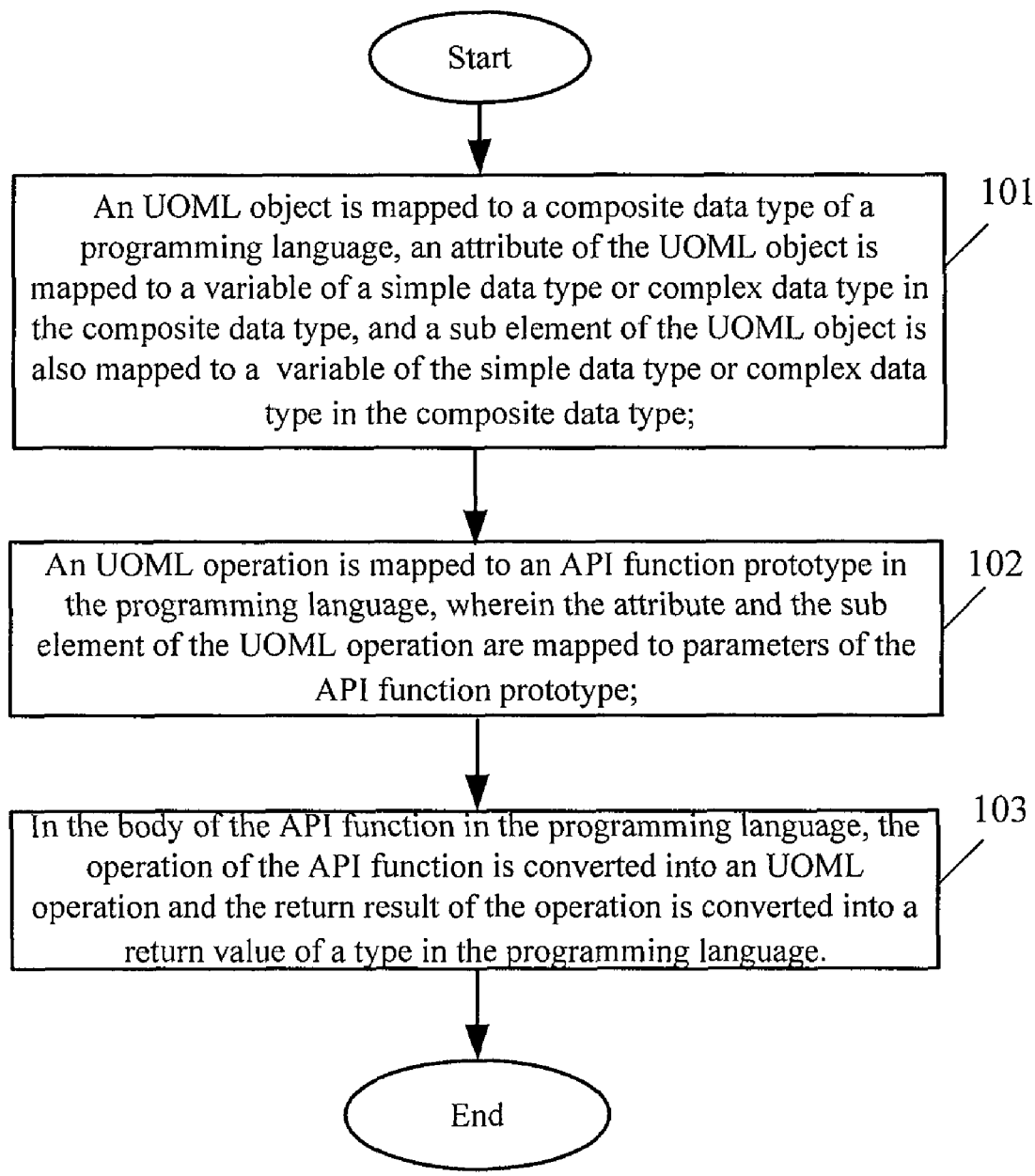
FIG. 1 is a flowchart of a method for encapsulating UOML into an API of a programming language in accordance with an embodiment of the present invention.

FIG. 1 is a flowchart of a method for encapsulating UOML into an API of a programming language in accordance with an embodiment of the present invention. As shown in FIG. 1, the method of the present invention includes the following steps.

Step 101: an UOML object is mapped to a composite data type of a programming language. An attribute of the UOML object is mapped to a variable of a simple data type or complex data type in the composite data type and a sub element of the UOML object is also mapped to a variable of the simple data type or complex data type in the composite data type.

Firstly, a representation of the UOML object is provided in the programming language. Every UOML object is mapped to a defined composite data type by utilizing the customized definition function of composite data types in the programming language. The composite data type may include a class in object-oriented language, or a structure in non-object-oriented language. The attribute of the UOML object can be represented with the variable of the simple data type or complex data type in the composite data type, e.g., a variable of INT type, CHAR type or FLOAT type, or an array. A sub element of the UOML object is usually an object in the UOML and the sub element of the UOML object is represented by a variable of the related composite data type defined in the programming language and corresponded to the sub element. A sub element of the UOML object, which is not an object in the UOML, e.g., coordinate(s) describing position, also may be represented by a variable of the simple data type. It should be noted that the variables of the simple data type, the complex data type and the composite data type may include a pointer variable.

Step 102: an UOML operation is mapped to an API function prototype in the programming language, wherein the attribute and the sub element of the UOML operation are mapped to parameters of the API function prototype.

According to the UOML standard, an operation may support a plurality of objects, so it should be taken into consideration whether the programming language supports function polymorphism when the UOML operation is converted into an API function prototype in the programming language. If the programming language does not support the function polymorphism, an individual API function prototype shall be defined for every object of the operation; if the programming language supports the function polymorphism, only one API function prototype may be defined for all objects of the operation, and the objects are indicated by different parameter types in the function prototype. The attribute and sub element of the UOML operation are mapped to the parameters of the API function prototype. When an object-oriented language is adopted, the API function may be defined as a member function of a class; when the attribute or sub element of the operation is a member variable of the class, the member function prototype may exclude the related parameter and the member variable may be referenced directly in the function body. Obviously, all attributes and sub elements of the operation can be mapped to parameters of the function prototype, just like in non-object-oriented language.

Step 103: according to the operation corresponding to the function prototype and the parameters of the function prototype, the operation of the API function is converted into an UOML operation and the UOML operation is executed in the body of the API function in the programming language, and then the return result of the UOML operation is converted into a return value of a type in the programming language.

In the body of the API function in the programming language, UOML operation instructions are generated according to the mapping relation between the function prototype and the UOML operation and the relation between the parameters of the function and the attribute and sub element of the UOML operation. The operation instructions are sent to the docbase management system and after executing the operation instructions, the docbase management system returns an executing result. Since the result returned from the docbase management system is in the UOML format, so the return result shall be converted into a return value of a type in the programming language.

Programming languages usually includes object-oriented languages and non-object-oriented languages. The processes of encapsulating UOML into APIs in different programming languages differ slightly from each other because of different characteristics of the different programming languages.

The process of encapsulating UOML into an API in an object-oriented language is explained hereinafter, taking C++ as an example of the object-oriented language.

Figure 2:
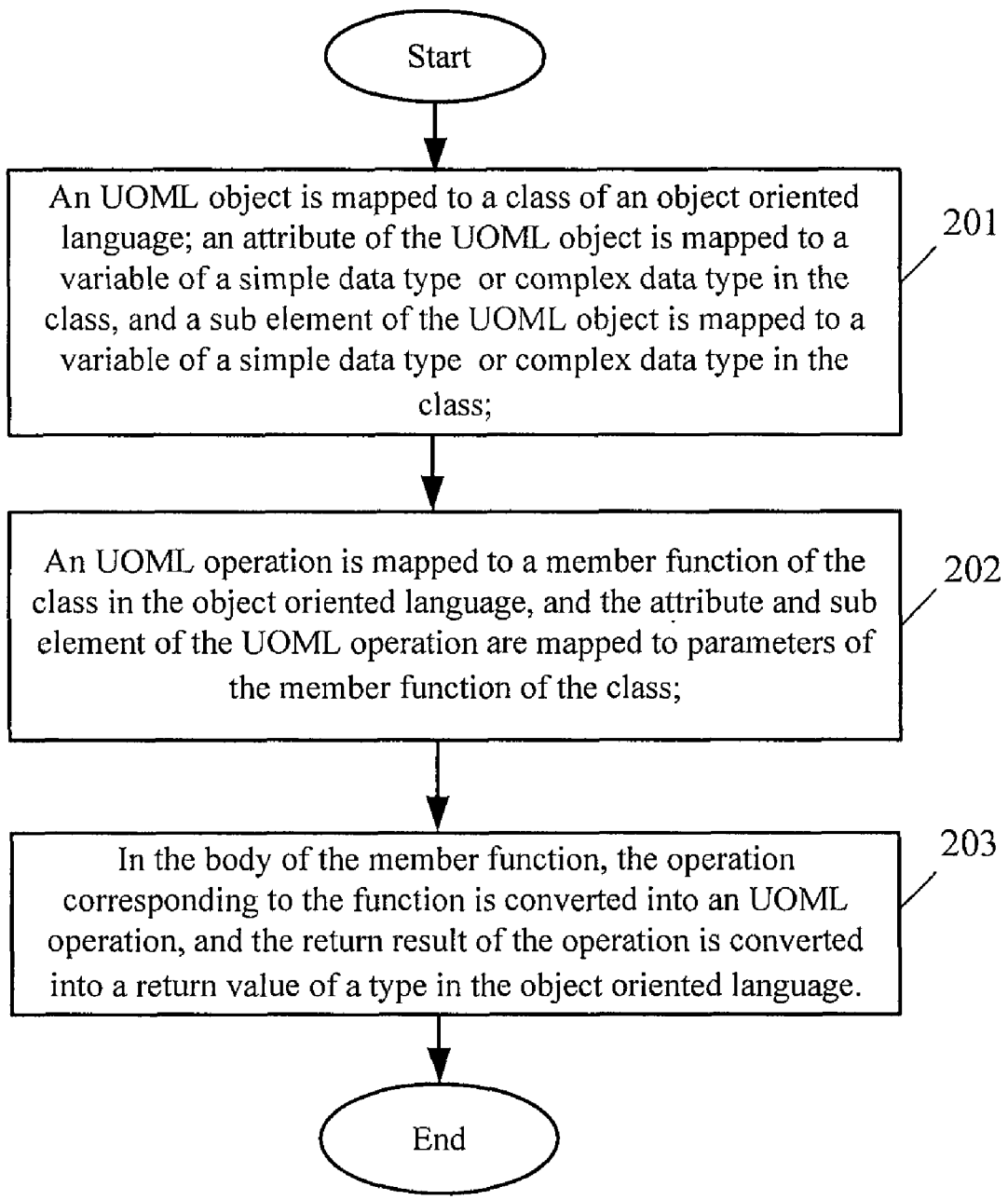
FIG. 2 is a flowchart of a method for encapsulating the UOML into an API of an object-oriented programming language in accordance with an embodiment of the present invention.

FIG. 2 is a flowchart of a method for encapsulating the UOML into an API of an object-oriented programming language in accordance with an embodiment of the present invention. As shown in FIG. 2, the method of the present invention includes the following steps.

Step 201: an UOML object is mapped to a class of an object-oriented language. An attribute of the UOML object is mapped to a variable of a simple data type or complex data type in the class and a sub element of the UOML object is mapped to a variable of class type or simple data type in the class.

Taking an UOML document object as an example, a class UOML_Doc is firstly defined in C++ to correspond to the UOML document object. The class can be derived from a base class, or be derived from none of base classes. Or, a base class is firstly defined for all UOML objects:

```
class UOML_Obj
{
public:
    virtual ~UOML_Obj( );
    void Init(UOML_Obj_Type type);
    UOML_Obj Clone(bool bMaintainRef = true);
    ...
};
```

Then UOML_Doc is derived from the base class UOML_Obj.

When the class UOML_Doc, which is mapped to the UOML document object, is defined, the sub elements of the UOML document object are mapped to member variables in the UOML_Doc class. The sub elements of the UOML document object include metadata, pageset, fontinfo, etc. Different sub elements are usually mapped to different classes, e.g., metadata is represented by UOML_Meta class, pageset is represented by UOML_Page class and fontinfo is represented by UOML_FontInfo class. Therefore, the sub elements of the UOML document object are mapped to certain member variables in the UOML_Doc class definition: UOML_Meta metadata, UOML_Page *pageset and UOML_FontInfo fontinfo. The sub element, pageset, can also be represented with an array of UOML_Page. Since the UOML document object does not have any attribute, the process of mapping attributes to member variables will not be performed.

Similarly, an UOML_Page class can be defined for an UOML page object. The attributes of the UOML page object, e.g., resolution, size, rotation, log, etc., are represented by member variables of integer or float type during the definition of the UOML_Page class, and the sub elements of the UOML page object, e.g., GS, metadata, are also represented by member variables in the UOML_Page class.

In this way, classes may be defined in the object-oriented language for all UOML objects. The UOML objects includes UOML_DOCBASE, UOML_DOCSET, UOML_DOC, UOML_PAGE, UOML_LAYER, UOML_OBJGROUP, UOML_TEXT, UOML_IMAGE, UOML_LINE, UOML_BEIZER, UOML_ARC, UOML_PATH, UOML_SRCFILE, UOML_BACKCOLOR, UOML_COLOR, UOML_ROP, UOML_CHARSIZE, UOML_TYPEFACE, UOML_ROLE, UOML_PRIV, etc. Those skilled in the art may define the classes according to the foregoing explanation and no further description will be given herein.

Step 202: an UOML operation is mapped to a member function of the class in the object-oriented language, and the attribute and sub element of the UOML operation are mapped to parameters of the member function of the class.

For example, operations on the UOML document object, such as UOML_OPEN and UOML_CLOSE, are mapped to corresponding member functions, i.e., Open( ) and Close( ), in the UOML_Doc class. The location information of the document, which is an attribute of the operation UOML_OPEN, is regarded as the parameter of the member function, i.e., Open( ): Open(char *szDocPath). The handle of the document object, which is a sub element of the operation UOML_CLOSE, is regarded as the parameter of the member function Close( ).

Other UOML operations, such as UOML_GET, UOML_SET, UOML_INSERT, UOML_DELETE and UOML_QUERY, can also be mapped to member functions in the class in a similar process.

Step 203: in the body of the member function, the operation corresponding to the function is converted into an UOML operation and the return result of the UOML operation is converted in to a return value of a type in the object-oriented language.

For example, in the body of the member function Open (char *szDocPath) in the UOML_Doc class, an invocation is converted into an UOML XML string that invokes the docbase management system and the string is then sent to the docbase management system:

```
<?xml version="1.0" encoding="UTF-8"?>
<UOML_OPEN create="true">
    <path val=szDocPath/>
</UOML_OPEN>
```

Upon receipt of the request (represented by the UOML XML string), the docbase management system performs the Open operation. If the document is successfully opened, an XML string will be returned. In the body of the function Open( ), an UOML_Doc object is constructed according to the received string and is returned as the return value of the function.

The process of encapsulating UOML into the API in the object-oriented language is explained above with reference to C++ as an example. It is obviously that the process can also be applied to other object-oriented languages, such as Object-C, Delphi, Java, Python, Ruby, etc.

The process of encapsulating UOML into an API in a non-object-oriented language is explained hereinafter, taking the programming language C as an example of the non-object-oriented language.

Figure 3:
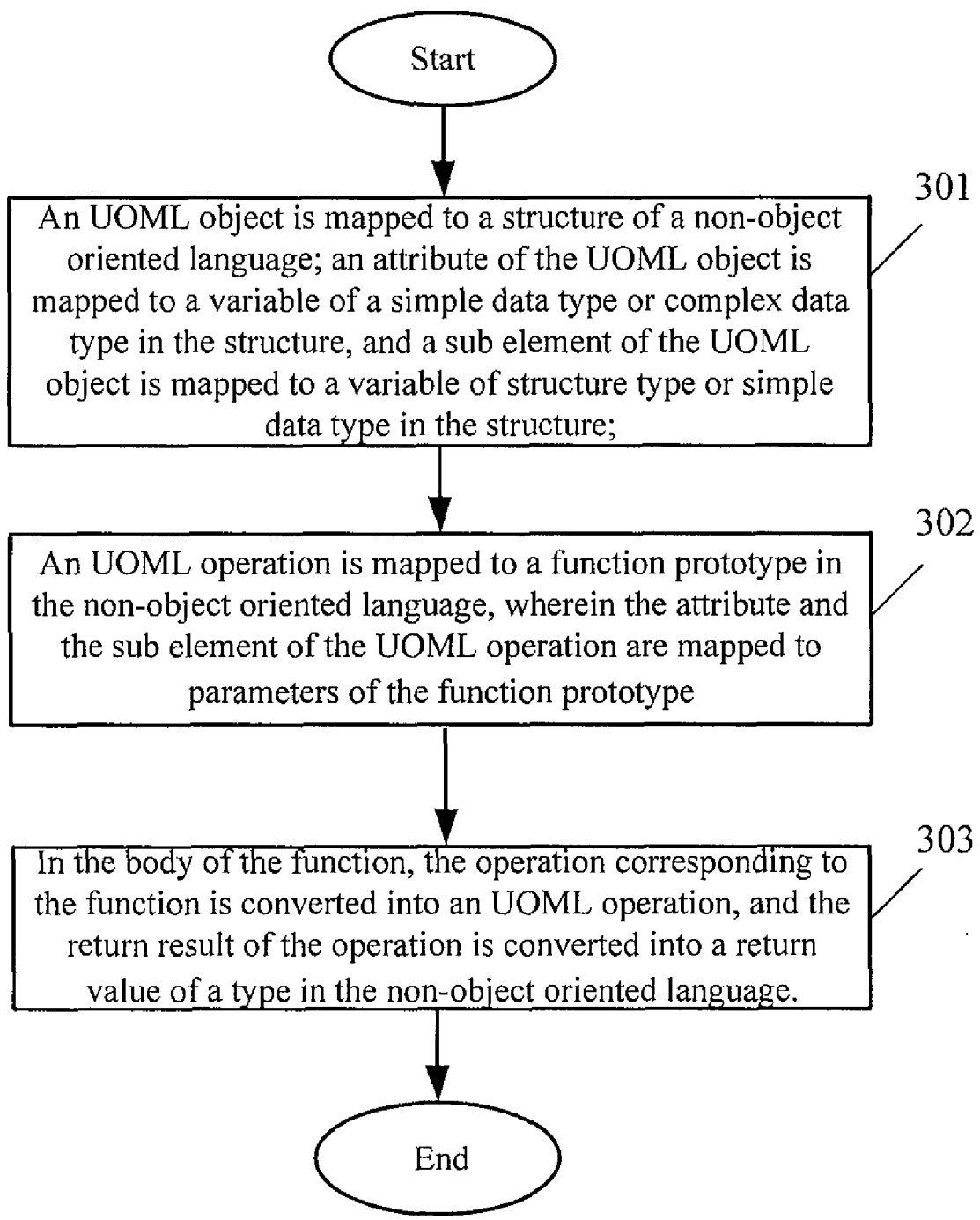
FIG. 3 is a flowchart of a method for encapsulating the UOML into an API of a non-object-oriented programming language in accordance with an embodiment of the present invention.

FIG. 3 is a flowchart of a method for encapsulating the UOML into an API of a non-object-oriented programming language in accordance with an embodiment of the present invention. As shown in FIG. 3, the method of the present invention includes the following steps.

Step 301: an UOML object is mapped to a structure of a non-object-oriented language. An attribute of the UOML object is mapped to a variable of a simple data type or complex data type in the structure and a sub element of the UOML object is mapped to a variable of structure type or simple data type in the structure.

Taking an UOML document object as an example, a structure struct_UOML_Doc is firstly defined in C to correspond to the UOML document object.

After the structure struct_UOML_Doc is defined for the UOML document object, the sub element of the UOML document object is mapped to a member variable in the structure struct_UOML_Doc. The UOML document object has sub elements including metadata, pageset, fontinfo, etc. The structures mapped to the sub elements are defined as follows: metadata is represented by the structure struct_UOML_Meta, pageset is represented by the structure struct_UOML_Page and fontinfo is represented by the structure struct_UOML_FontInfo. Therefore, the sub elements of the UOML document object correspond to certain member variables, i.e., struct_UOML_Meta metadata, struct_UOML_Page *pageset, struct_UOML_FontInfo fontinfo, in the definition of the structure struct_UOML_Doc. The sub element, pageset, can also be represented with an array of struct_UOML_Page. Since the UOML document object does not have any attribute, the process of mapping attributes to member variables will not be performed.

Similarly, a structure struct_UOML_Page can be defined for an UOML page object. The attributes of the UOML page object, e.g., resolution, size, rotation, log, etc., are represented by member variables of integer or float type during the definition of the structure struct_UOML_Page, and the sub elements of the UOML page object, e.g., GS, metadata, are also represented by member variables in the structure struct_UOML_Page.

In this way, structures may be defined in the non-object-oriented language for all UOML objects. The UOML objects includes UOML_DOCBASE, UOML_DOCSET, UOML_DOC, UOML_PAGE, UOML_LAYER, UOML_OBJGROUP, UOML_TEXT, UOML_IMAGE, UOML_LINE, UOML_BEIZER, UOML_ARC, UOML_PATH, UOML_SRCFILE, UOML_BACKCOLOR, UOML_COLOR, ROP, UOML_CHARSIZE, UOML_TYPEFACE, UOML_ROLE, UOML_PRIV, etc. Those skilled in the art may define the structures according to the foregoing explanation and no further description will be given herein.

Step 302: an UOML operation is mapped to a global function prototype in the non-object-oriented language, and the attribute and the sub element of the UOML operation are mapped to parameters of the function prototype.

Also taking the UOML document object as an example, API function prototypes, such as struct_UOML_Doc*, UOML_Doc_Open (char *szDocPath) and void UOML_Doc_Close(HANDLE *hDocHandle), are defined for operations on the UOML document object, such as UOML_OPEN and UOML_CLOSE.

The location information of the document, which is an attribute of the operation UOML_OPEN, is regarded as the parameter of the API function UOML_Doc_Open ( ), i.e., szDocPath. the handle of the document object, which is a sub element of the operation UOML_CLOSE, is regarded as the parameter of the API function UOML_Doc_Close, i.e., hDocHandle.

Other UOML operations, such as UOML_GET, UOML_SET, UOML_INSERT, UOML_DELETE, UOML_QUERY, can also be mapped to API function prototypes in such way.

Step 303: in the body of the function, the operation corresponding to the function is converted into an UOML operation and the return result of the UOML operation is converted in to a return value of a type in the non-object-oriented language.

For example, in the body of the API function UOML_Doc_Open (char *szDocPath), an invocation is converted into an UOML XML string that invokes the docbase management system and the string is then sent to the docbase management system:

```
<?xml version="1.0" encoding="UTF-8"?>
<UOML_OPEN create="true">
    <path val=szDocPath/>
</UOML_OPEN>
```

Upon receipt of the request (represented by the UOML XML string), the docbase management system performs the Open operation. If the document is successfully opened, an XML string will be returned. In the body of the function UOML_Doc_Open( ), an UOML_Doc object is constructed according to the received string and is returned as the return value of the function.

The process of encapsulating UOML into the API in the non-object-oriented language is explained above with reference to the language C as an example. It is obviously that the process can also be applied to other non-object-oriented languages, such as TCL, Pascal, Perl, etc.

Figure 4:
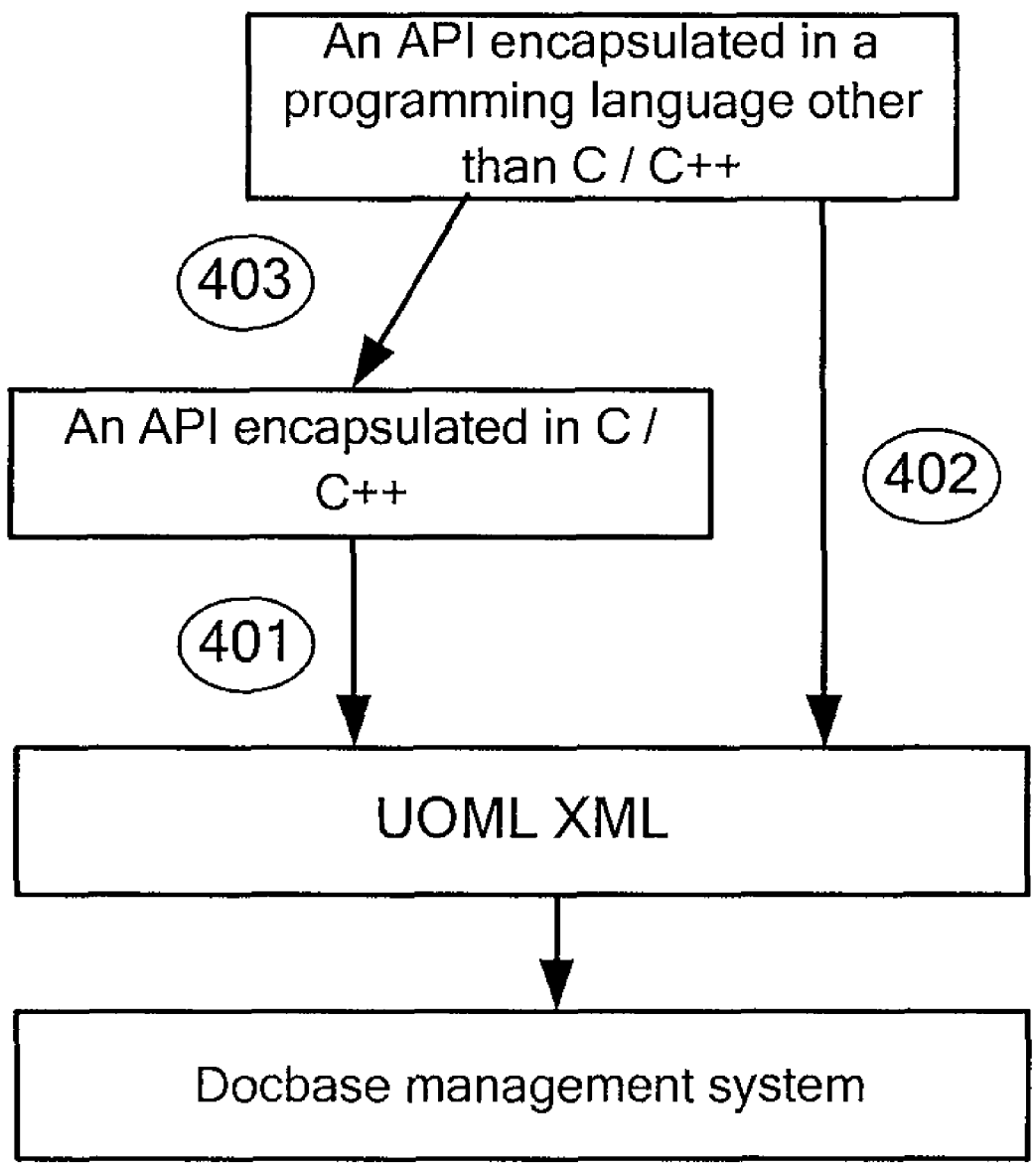
FIG. 4 is a schematic illustrating encapsulation hierarchies of an API of a programming language in accordance with an embodiment of the present invention.

FIG. 4 is a schematic illustrating encapsulation hierarchies of an API of a programming language in accordance with an embodiment of the present invention. As shown in FIG. 4 Procedure 401 indicates the process of converting the API encapsulated in C/C++ into UOML XML instructions within corresponding function body, and Procedure 402 indicates the process of converting the API encapsulated in a programming language other than C/C++ into UOML XML instructions within corresponding function body. Beside directly converted into the UOML XML instructions within corresponding function body, the API encapsulated in a programming language other than C/C++ also can be converted into UOML XML instructions by invoking a corresponding API function encapsulated in C++/C within corresponding function body via the interface between C++/C and the programming language, as shown in Procedure 403. The actual process of converting into the UOML XML instructions is done in the body of the API function encapsulated in C/C++. Taking the programming language Java as an example, the API function encapsulated in C/C++ can be bound with the API function encapsulated in Java via the Java Native Interface (JNI) within the body of the API function encapsulated in Java, therefore the process of UOML XML converting need not be implemented in the Java function body directly. Most of script languages provide extension mechanisms via C++ or C, and the binding of an API in a script language and an API function of local application programs can be achieved by using such an extension mechanism. Besides Java, the script languages may also include TCL, Perl, Python and Ruby.

According to the method of the present invention, the UOML can be encapsulated into the API in the programming language. When a developer develops an application of the docbase management system with the programming language, the encapsulated API in the programming language can be invoked directly, therefore a lot of works on parsing the UOML can be saved and the development efficiency can be improved.

The foregoing are only preferred embodiments of the present invention and are not for use in limiting this invention, any modification, equivalent replacement or improvement made under the spirit and principles of this invention is included in the protection scope of this invention.

The invention claimed is:

1. A computer-implemented method for encapsulating Unstructured Operation Markup Language (UOML) into an Application Programming Interface (API), comprising:
    mapping an object of an UOML operation to a data type of a programming language,
    mapping the UOML operation to an API function prototype in the programming language, wherein an attribute or sub element of the UOML operation is mapped to a parameter of the API function prototype;
    wherein, when an API function is invoked, the API function issues a corresponding UOML operation instruction to a docbase management system according to the mapping relations;
    after an operation defined by the UOML operation instruction is executed by the docbase management system, the return result from the docbase management system is converted into a data type of the programming language by the API function.

2. The method according to claim 1, wherein, the object of the UOML operation is mapped to a composite data type of the programming language.

3. The method according to claim 2, an attribute or sub element of the object of the UOML operation is mapped to a simple data type or complex data type in the composite data type.

4. The method according to claim 1, UOML operations on different objects are differentiated by different function prototypes.

5. The method according to claim 1, wherein the programming language comprises an object-oriented programming language;
    the data type of the programming language comprises a class;
    the API function prototype in the programming language comprises a member function in the class;
    the attribute and sub element of the UOML operation are mapped to parameter of the member function.

6. The method according to claim 5, wherein the object-oriented programming language comprises C++, Object-C, Delphi, Java, Python or Ruby.

7. The method according to claim 1, wherein the programming language comprises a non-object-oriented programming language;
    the data type of the programming language comprises a structure; and
    the API function prototype in the programming language comprises a global function prototype;
    the attribute and sub element of the UOML operation are mapped to parameter of the global function prototype.

8. The method according to claim 7, wherein the non-object-oriented programming language comprises C, TCL, Pascal or Perl.

9. The method according to claim 3, wherein the programming language has an interface to C or C++ language; and
    the API function issues the corresponding UOML operation instruction to the docbase management system by invoking the API function encapsulated with C++ or C language through the interface to C or C++ language.

10. The method according to claim 9, wherein the programming language includes Java, TCL, Perl, Python or Ruby.

* * * * *